United States Patent [19]

McKevitt

[11] Patent Number: 4,805,399
[45] Date of Patent: Feb. 21, 1989

[54] MONOPROPELLANT PLENUM PROPULSION SYSTEM WITH INTEGRATED VALVE/NOZZLE FOR FAST RESPONSE THRUST

[75] Inventor: Frank X. McKevitt, Bellevue, Wash.

[73] Assignee: Rockcor Incorporated, Redmond, Wash.

[21] Appl. No.: 147,072

[22] Filed: Jan. 20, 1988

Related U.S. Application Data

[63] Continuation of Ser. No. 811,569, Dec. 18, 1985, abandoned.

[51] Int. Cl.⁴ .......................... F02K 9/60; F02K 9/68
[52] U.S. Cl. .................................. 60/200.1; 60/39.462
[58] Field of Search ................... 60/39.462, 731, 200.1, 60/203.1, 271, 227; 239/265.19

[56] References Cited

U.S. PATENT DOCUMENTS

| | | | |
|---|---|---|---|
| 2,634,577 | 4/1953 | Halford et al. | 60/39.462 |
| 3,135,703 | 6/1964 | Sim | 60/39.462 |
| 3,138,929 | 6/1964 | Schate | 60/39.462 |
| 3,910,191 | 10/1975 | Williams | 60/271 |
| 3,968,646 | 7/1976 | Betts et al. | 60/271 |
| 4,120,151 | 10/1978 | Quigley | 60/39.462 |

Primary Examiner—Louis J. Casaregola
Attorney, Agent, or Firm—Bruce E. Burdick

[57] ABSTRACT

A monopropellant propulsion system has a tank which includes a liquid chamber and a gas plenum. A monopropellant liquid is contained in the liquid chamber, and a monopropellant gas generator communicates with the gas plenum and the liquid chamber. The gas generator is operable to generate pressurized monopropellant gas in the gas plenum upon receiving monopropellant liquid from the liquid chamber. A one-way flow control valve controls flow of monopropellant liquid from the liquid chamber to the monopropellant gas generator. There is always a standing supply of pressurized monopropellant gas in the gas plenum such that a thrust chamber communicating with the gas plenum will always be supplied with gas. A thrust-generating mechanism is disposed in the thrust chamber in the form of an integrated valve and nozzle. The nozzle has a throat region communicating with the thrust chamber and the valve is mounted for movement relative to the nozzle for respectively opening and closing the throat region thereof upon actuation of the mechanism between its open and closed conditions to respectively produce thrust or block production of thrust.

16 Claims, 2 Drawing Sheets

MONOPROPELLANT PLENUM PROPULSION SYSTEM WITH INTEGRATED VALVE/NOZZLE FOR FAST RESPONSE THRUST

This is a continuation of application Ser. No. 811,569 filed Dec. 18, 1985 now abandoned.

The invention described herein was not made under Government contract.

BACKGROUND OF THE INVENTION

1. Field of the Invention

The present invention generally relates to monopropellant propulsion systems and, more particularly, is concerned with a unique monopropellant plenum propulsion system having fast response thrust capability.

2. Description of the Prior Art

For spacecraft or missile attitude control, small propulsion systems usually of the bipropellant or monopropellant type are provided. Such systems are pulsed for short durations, commonly lasting only a fraction of a second, and many thousands of times during a given mission. A bipropellant type system uses two separate propellants, a fuel and an oxidizer, which are not mixed until they come in contact with each other in a combustion chamber when a thrust pulse is needed. A monopropellant type system contains the oxidizing agent and combustible or decomposable matter in a single substance. One conventional monopropellant is a homogeneous chemical agent, such as hydrazine, which is decomposed in a catalyst bed when the thrust pulse is needed.

Monopropellant type propulsion systems have many advantages over bipropellant type systems, several of which are reduced complexity and fewer steps required to produce thrust which could result in faster response. One monopropellant propulsion system is disclosed in U.S. Pat. No. 4,352,782 to James M. Daly and assigned to Rocket Research Corporation. Basically, the propulsion system of the aforesaid patent includes a catalytic gas generator which has a catalytic bed within a thrust chamber, a means to supply a liquid propellant such as hydrazine to the thrust chamber. The catalyst in the catalytic bed reacts with and converts the propellant into a high temperature gas which exits the catalytic bed and is expanded through a conventional nozzle system to produce thrust. Also previously known are bipropellant generators in which an oxidizer such as $N_2O_4$ or $F_2$ is fed (separately from the propellant) to the thrust chamber to react with the propellant. One such generator is shown in U.S. Pat. No. 3,695,041 issued Oct. 3, 1972 to R. F. Eggers and D. L. Emmons and also assigned to Rocket Research Corporation, and is a two-stage device wherein the oxidizer can selectively either not be provided (in which case the engine is a monopropellant engine) for low thrust or be provided (in which case the engine is a bipropellant engine) for high thrust. The U.S. Pat. Nos. 4,352,782 and 3,695,041 are directed to a special means of confining the bed and a variable thrust engine respectively, but serve as background information to describe the nature of monopropellant gas generators prior to the present invention.

However, even the response time of conventional monopropellant propulsion systems, such as the one briefly described above, is too long for use in certain applications, such as missile defense interceptors. For instance, response time is lengthened by the time lags necessary to: (a) open the propellant valve, (b) fill the valve/injector volume, (c) inject propellant into the catalyst bed, (d) decompose the injected propellant, (e) raise the pressure in the thrust chamber, and (f) accelerate the propellant through the nozzle. Prior attempts to increase response time have concentrated on reducing the individual lags described above by increasing valve speed and/or reducing the injector, catalyst bed, and/or chamber volumes. These approaches are limited in their effectiveness since these volumes are an essential part of the propellant flow path.

Consequently, in order to achieve substantially faster response time, a need exists for a fresh approach to monopropellant propulsion system design so as not to be hamstrung by the requirements of the conventional system which allow only fine-tuning of the system.

SUMMARY OF THE INVENTION

The present invention provides a monopropellant plenum fast response propulsion system designed to satisfy the aforementioned needs. The system of the present invention completely eliminates all but the first and last of the above described time lags by removing them as factors in thrust response.

In accordance with one feature of the present invention, the time lags are reduced by decomposing the propellant prior to the time that it is needed and storing the decomposition gases in a plenum. The thrust producing elements of the propulsion system use gas from this plenum in conjunction with a unique gas valve/nozzle combination which is actuated on command. Any number of thrust producing elements may be used with the plenum to provide for various propulsive functions. This unique, fresh approach results in a single decomposition gas generator (in lieu of one for each thrust producing element heretofore) which operates at the maximum duty cycle, thus minimizing weight and maximizing performance.

Another feature of the present invention is that, unlike previous approaches, the valve and nozzle geometry is now integrated so as to develop an efficient nozzle flow field from the nozzle throat formed at the valve minimum seat area region. Some prior approaches incorporated a plenum between the valve and nozzle, reducing response and efficiency. The integrated valve/nozzle configuration incorporated herein provides for shut-off at the nozle throat and efficient expansion of the propellant gas at all valve positions. In such manner, a fast acting thrust is provided which takes maximum advantage of the potential offered by the unique plenum type propulsion system.

Accordingly, the present invention is directed to a monopropellant propulsion system comprising the combination of: (a) enclosure means defining a liquid chamber and a gas plenum; (b) a monopropellant liquid contained in the liquid chamber; (c) a monopropellant gas generator communicating with the gas plenum and the liquid chamber and being operable to generate pressurized monopropellant gas in the gas plenum upon receiving monopropellant liquid from the liquid chamber; (d) flow control means interconnecation the liquid chamber and the monopropellant gas generator and being actuated upon the monopropellant liquid being pressurized above a predetermined level for allowing flow of the monopropellant liquid into the monopropellant gas generator; (e) pressure-generating means being actuatable for pressurizing the monopropellant liquid in the liquid chamber above the predetermined level; and (f) thrust-producing means communicating with the gas plenum to receive pressurized monopropellant gas therefrom and being operable to produce thrust upon command.

More particularly, the flow control means is a one-way check valve which only allows flow of monopropellant liquid into the monopropellant gas generator from the liquid chamber when pressurized above the predetermined pressure. Also the monopropellant gas generator is disposed in the gas plenum and includes a catalyst bed. Further, the enclosure means includes a hollow tank having opposite ends, and partition means defining a gas chamber in one end of the tank, the gas plenum in the opposite end of the tank, and the liquid chamber between said gas chamber and said gas plenum. The partition means includes a stationary wall spaced from the opposite tank end and extending across the tank so as to separate the gas plenum from the liquid chamber, and a movable wall spaced from the one tank end and extending across the tank so as to separate the gas chamber from the liquid chamber.

Still further, the pressure-generating means includes a gas generator being actuatable for generating a gas to pressurize the gas chamber above the predetermined level and cause movement of the movable wall so as to expand the gas chamber and contract the liquid chamber and thereby pressurize the monopropellant liquid therein above the predetermined level and force flow thereof through the flow control means into the monopropellant gas generator.

Also, the present invention is directed to a propulsion system comprising the combination of: (a) enclosure means defining a gas plenum; (b) pressurized propellant gas contained in the plenum; and (c) thrust-producing means communicating with the gas plenum so as to contain the pressurized propellant gas in conjunction with the gas plenum and being operable to produce thrust upon command. More particularly, the thrust-producing means includes means defining a thrust chamber communicating with the gas plenum such that the pressurized gas is contained concurrently by both of the thrust chamber and the gas plenum. Further, a thrust-generating mechanism communicates with the thrust chamber and is actuatable between a closed condition in which no thrust is produced and an open condition producing thrust. Also, means are provided for selectively actuating the thrust-generating mechanism.

The thrust-generating mechanism is an integrated valve and nozzle with the latter having a throat region communicating with the thrust chamber and the valve being mounted for movement relative to the nozzle for respectively opening and closing the throat region thereof upon actuation of the mechanism between its open and closed conditions.

The actuating means includes an actuator movably disposed in the thrust chamber and interconnected to the valve of the thrust-generating mechanism such that movement of the actuator between its retracted and extended positions correspondingly moves the valve to close and open the nozzle throat region. Also, pressure forces and resilient means bias the actuator to its retracted position and thereby the valve to close the nozzle throat region. Finally, means are provided for selectively communicating the pressurized propellant gas to the actuator independent of the thrust chamber for forcing the actuator against the biasing of the resilient means to its extended position and thereby the valve to open the nozzle throat region.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
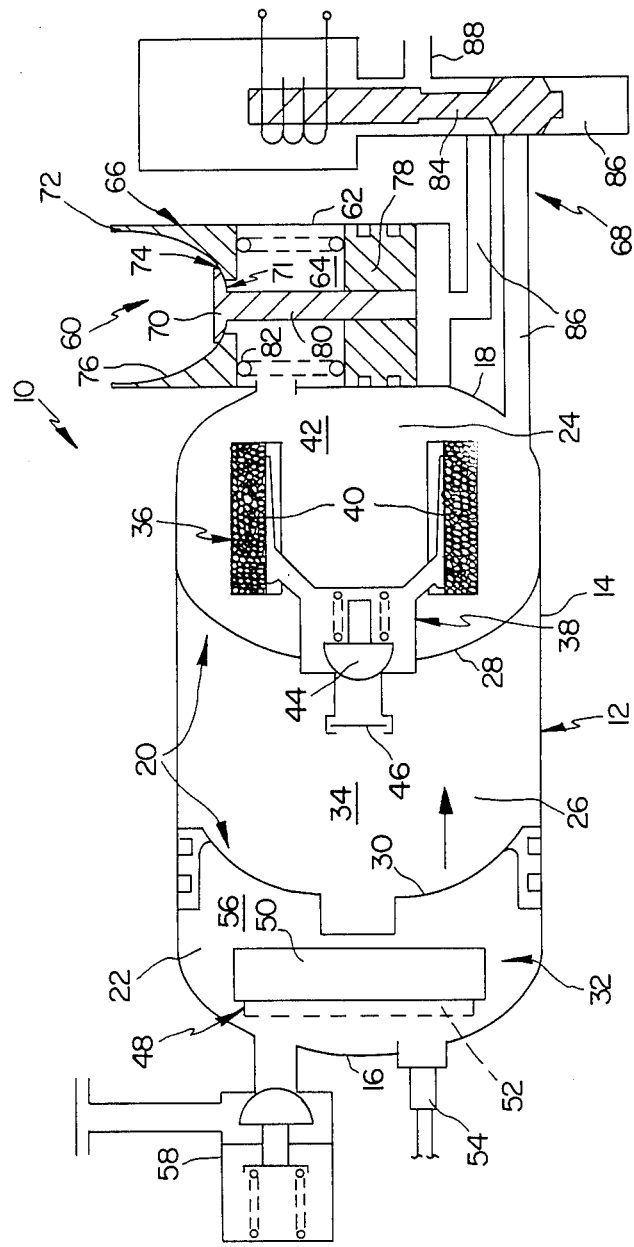
FIG. 1 is a schematical view of the monopropellant plenum type fast response propulsion system of the present invention, with the integrated valve/nozzle being shown in its closed and inoperative condition in which no thrust is produced.

Referring now to the drawings, and particularly to FIG. 1, there is shown a fast response monopropellant propulsion system, generally indicated by the numeral 10 and being constructed in accordance with the principles of present invention. The propulsion system 10 basically includes a hollow tank 12 having a generally cylindrical wall 14 and opposite ends 16 and 18, and partition means, generally designated 10, defining an expandable chamber 22 in the tank 12 adjacent to the one end 16 thereof, and a contractable chamber 26 in the tank 12 between the expandable chamber 22 and the gas plenum 24.

In particular the wall 14 of the tank 12 can also serve as a portion of the skin of a missile in which the propulsion system 10 can be employed. Also, the tank partition means 20 is composed by spaced apart stationary and movable walls 28 and 30. The stationary wall 28 is also spaced from the opposite tank end 18 and extends across and interconnects with the cylindrical tank wall 14 so as to separate the gas plenum 24 from the contractable chamber 26. The movable wall 30, preferably in the form of a positive expulsion piston, is also spaced from the one tank end 16 and extends across and slidably engages the interior of the cylindrical tank wall 14 so as to separate the expandable chamber 22 from the contractable chamber 26. It is the provision of the movable wall 30 and means for moving the same, to be described below, which provide concurrent expansion and contraction of chambers 22 and 26.

Also, the propulsion system 10 includes pressure-generating means, generally designated 32, communicating with the expandable chamber 22 of the tank 12, a monopropellant liquid 34, such as a liquid propellant hydrazine blend, contained in the contractable chamber 26 of the tank, a monopropellant gas generator 36 disposed in the gas plenum 24 of the tank, and passive flow control means 38 interconnecting the contractable chamber 26 and the monopropellant gas generator 36. The monopropellant gas generator 36 communicates with the gas plenum 24 and the contractable chamber 26 and includes a catalyst bed 40, composed of Shell Development Corp. No. 405 catalyst, which reacts in a known manner upon receiving monopropellant liquid 34 from the contractable chamber to generate pressurized monopropellant gas 42 in the gas plenum 24.

More particularly, the passive flow control means 38 includes a one-way inline propellant check valve 44 interconnecting the contractable chamber 26 and the monopropellant gas generator 36 and a propellant burst disc 46 located upstream of the check valve. The check valve 44 is preset to be actuated to open upon the monopropellant liquid 34 being pressurized above a predetermined level, such as 2000 psi, to allow flow of the propellant liquid into the monopropellant gas generator 36. The check valve 44 only allows flow of monopropellant liquid 34 into gas generator 36 from the contractable chamber 26 and not vice versa. The purpose of the propellant burst disc 46 is to isolate the liquid propellant 34 during inactive storage.

The mechanism for pressurizing the monopropellant liquid 34 sufficiently to cause it to flow through the check valve 44 into the monopropellant gas generator 36 is the pressure-generating means 32 in the left end 16 of the tank 12 which communicates with the expandable chamber 22. The pressure-generating means 32 includes a gas generator 48 having a solid propellant grain 50, such as Rocket Research Company No. 4115 solid propellant, initiator material 52, such as BKNO$_3$, being connected to solid propellant grain for starting combustion of the same, and an ignitor 54 in the form of a dual bridge wire squib, attached to the tank end 16 adjacent to the initiator material 52. The ignitor 54 is actuated in any suitable manner.

As the gas pressure in the expandable chamber 22 increases, the movable expulsion piston defining the common movable wall 30 between the expandable and contractable chambers 22 and 26 is forced toward the right and causes pressurizing of the monopropellant liquid 34 contained in the contractable chamber 26. Once the pressure of the liquid 34 exceeds the predetermined actuating level of the check valve 44, it overcomes the force biasing the check valve 44 to its closed position and opens the valve 44, allowing flow of the fluid 34 into the monopropellant gas generator 36. A pressure relief valve 58 is connected to the expandable chamber 22 and is set to open for non-propulsively venting the chamber 22 when a higher present pressure level, such as 2200 psi, is reached therein to limit the increase in pressurization of the chamber to a safe level. Combustion of the solid propellant grain 50 is terminated by exhaustion of the solid propellant grain 50, which is sized for the maximum mission operating time.

From the above, it should be easily understood that the gas plenum 24 will be filled with monopropellant gas 42 at full pressure ahead of the time when it will be needed by the propulsion system 10 for generating thrust. As the monopropellant gas is used for thrust-generating purposes, in a manner to be described below, the gas plenum 24 is automatically resupplied with gas and maintained near full pressure due to the pressure differential between the liquid propellant 34 and the plenum 42 when the valves 70 are open and producing thrust.

Lastly, the propulsion system 10 includes means, generally designated 60, located at the opposite tank end 18 which communicates with the gas plenum 24 of the tank 12 to receive pressurized monopropellant gas 42 therefrom and is operable to produce thrust upon command. In one exemplary embodiment, the thrust-producing means 60 includes a housing 62 defining a thrust chamber 64 which is always in communication with the monopropellant gas plenum 24 so as to contain the pressurized monopropellant gas 42 concurrently or in conjunction with the gas plenum. Thus, fully pressurized gas is available in the thrust chamber 64 for use to produce thrust upon command.

Figure 2:
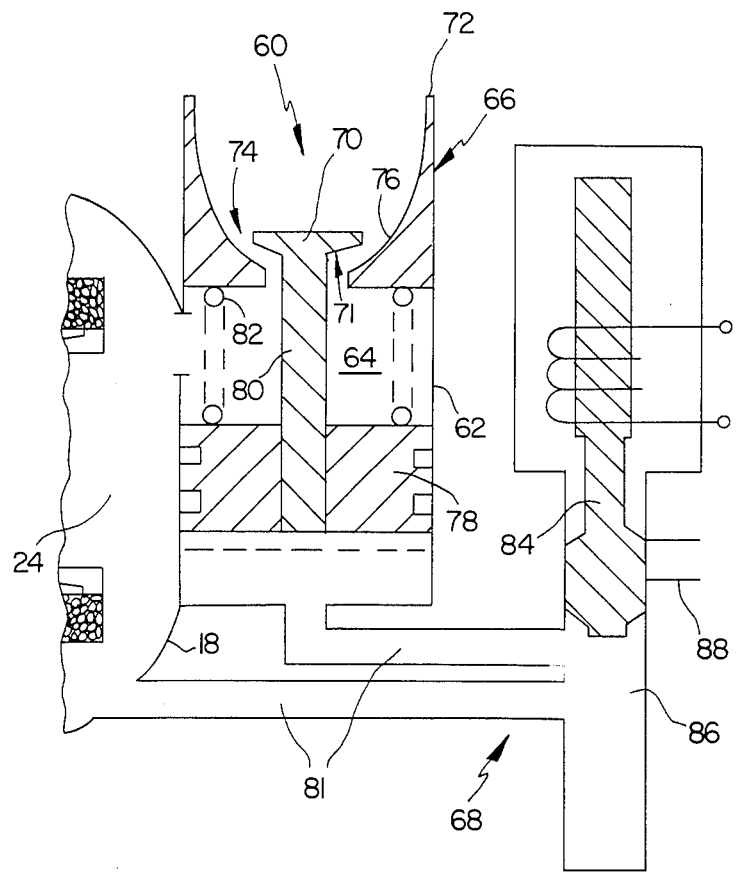
FIG. 2 is a schematical view of a fragmentary portion of the propulsion system of FIG. 1, showing the integrated valve/nozzle in its open and operative condition producing thrust.

In addition to the thrust chamber 64, the thrust-producing means 60 includes a thrust-generating mechanism, generally indicated as 66, communicating with the thrust chamber 64 and being operable by actuating means, generally designated 68, between a closed condition, as seen in FIG. 1, in which no thrust is produced and an open condition, as depicted in FIG. 2, producing thrust. The thrust-generating mechanism is a unique integrated valve 70 and nozzle 72. The nozzle 72 has a gas expansion-deflection configuration and in conjunction with the valve 70 has a throat region 74 communication with the thrust chamber 64. The thrust control valve 60 is mounted for movement relative to the nozzle 72 for respectively opening and closing the throat region 74 thereof upon actuation of mechanims 66 between its open and closed conditions. In particular, in the closed condition of the mechanism 66 and of the throat region 74, as seen in FIG. 1, the valve 70 is seated upon the nozzle surface 76. In view of the monopropellant gas being at full pressure in the gas plenum 24 and in the thrust chamber 64 which is in unobstructed communication with the plenum at both open and closed conditions of the mechanism 66, thrust is produced by the mechanism 66 instantly upon opening of the thrust control valve 70. There is no thrust tailoff due to decomposition/combustion of resiudal propellant or chamber blowdown, as in prior systems. The gas plenum 24 serves as an accummulator to absorb gas generator initiation time lags while continuously providing a full pressure source of monopropellant gas 42 to the thrust-generating mechanism 66.

The actuating means 68 includes an actuator piston 78 movably disposed in the thrust chamber 64 of the housing 62. The piston 78 is interconnected to a stem 80 of the thrust control valve 70 such that reciprocal movement of the piston between its retracted and extended positions correspondingly moves the valve 70 to close and open of the nozzle throat region 74, as respectively depicted in FIGS. 1 and 2. Resilient means in the form of a coil spring 82 captured and compressed between the piston 78 and underside of the nozzle 72 and the pressure forces on the thrust chamber 64 side of the piston biases the piston to its retracted position and thereby the valve 70 to its seated position in which it closes the nozzle throat region 74.

The actuating means 68 also includes a switch member 84 for selectively communicating a small portion of the pressurized propellant gas 42 from the gas plenum 24 to the piston 78 along a passageway 86 equalizing pressure on both sides of the piston 78. In such manner, the piston 78 is forced against the biasing of the spring 82 to its extended position by the unbalanced pressure force acting on the underside 71 of the valve 70 and thereby the valve 70 is unseated and opens the nozzle throat region 74. The passageway 86 also interconnects the gas plenum 24 with a pressure-releasing vent 88. The switch member 84 is disposed in the passagewy 86 and, preferably being an electric solenoid pilot valve, is selectively movable between an actuating position wherein, as seen in FIG. 2 flow communication is blocked between the vent 88 and the piston 78 and permitted between the plenum 24 and the piston such that the actuator 80 is forced to its extended position. On the other hand, deactivation of the switch member 84 causes it to move to a venting position wherein, as seen in FIG. 1, flow communication is blocked between the plenum 24 and the piston 78 and permitted between the vent 88 and the piston such that the piston is returned to its retracted position by the bias imposed by the spring 82, and the pressure force acting on the thrust chamber 64 side of the piston 78, the piston diameter (area) being selected so as to provide a pressure force exceeding that acting in the reverse direction on the underside 71 of the valve 70.

Advantages of the monopropellant plenum propulsion system 10 of the present invention over other bipropellant systems are as follows: (a) ability to deliver very small thrust impulse bits with initial tests demonstrating 4 millisecond pulse capability; (b) single working fluid leads to a simplified design approach having high inherent reliability and lower cost; (c) improved storability and safety characteristics since only a single working fluid is involved; (d) relatively low gas temperature allowing use of conventional materials of construction; (e) no dribble volume, thereby providing precise and extremely fast response times and insensitivity to environmental loads; (f) adaptability to a multiple thruster configuration with minimum system modification; (g) ability to provide a warm gas source for other control functions such as roll control and jet interactive lift augmentation if such requirements should develop; (h) readily adaptable to deep throttling (§10:1) if such requirements should develop; and (i) low freezing point hydrazine blends are available to operate at temperatures down to −65° F.

It is thought that the fast response propulsion system of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. In a monopropellant propulsion system, the combination comprising:
   (a) enclosure means defining a liquid chamber and a gas plenum;
   (b) a monopropellant liquid contained in said liquid chamber;
   (c) a monopropellant gas generator communicating with said gas plenum and said liquid chamber and being operable to generate pressurized monopropellant gas in said gas plenum upon receiving monopropellant liquid from said liquid chamber;
   (d) means for controlling flow of monopropellant liquid from said liquid chamber to said monopropellant gas generator; and
   (e) thrust-producing means communicating with said gas plenum so as to contain said pressurized monopropellant gas in conjunction with said gas plenum and being operable to produce thrust upon command;
   (f) said thrust-producing means including means defining a thrust chamber communicating with said gas plenum such that said pressurized monopropellant gas is contained concurrently by both of said thrust chamber and said gas plenum, a thrust-generating mechanism communicating with said thrust chamber and being actuatable between a closed condition in which no thrust is produced and an open condition producing thrust, and means for selectively actuating said thrust-generating mechanism;
   (g) said actuating means of said thrust-producing means including an actuator disposed in said thrust chamber for movement between retracted and extended positions for correspondingly actuating said thrust-generating mechanism between its closed and open conditions, resilient means and pressure forces biasing said actuator to its retracted position and thereby said thrust-generating mechanism to its closed condition, and means for selectively communicting said pressurized propellant gas to said actuator independent of said thrust chamber for forcing said actuator against said biasing of said resilient means to its extended position and thereby said thrust-generating mechanism to its open position.

2. In a monopropellant propulsion system, the combination comprising:
   (a) enclosure means defining a liquid chamber and a gas plenum;
   (b) a monopropellant liquid contained in said liquid chamber;
   (c) a monopropellant gas generator communicating with said gas plenum and said liquid chamber and being operable to generate pressurized monopropellant gas in said gas plenum upon receiving monopropellant liquid from siad liquid chamber;
   (d) means for controlling flow of monopropellant liquid from said liquid chamber to said monopropellant gas generator; and
   (e) thrust-producing means communicating with said gas plenum so as to contain said pressurized monopropellant gas in conjunction with said gas plenum and being operable to produce thrust upon command;
   (f) said thrust-producing means including means defining a thrust chamber communicating with said gas plenum such that said pressurized monopropellant gas is contained concurrently by both of said thrust chamber and said gas plenum, a thrust-generating mechanism communicating with said thrust chamber and being actuatable between a closed condition in which no thrust is produced and an open condition producing thrust, and means for selectively actuating said thrust-generating mechanism;
   (g) said thrust-generating mechanism being an integrated valve and nozzle, said nozzle having a throat region communicating with said thrust chamber and said valve being mounted for movement relative to said nozzle for respectively opening and closing said throat region thereof upon actuation of said mechanism between said open and closed conditions.

3. In a propulsion system, the combination comprising:
   (a) enclosure means defining a gas plenum;
   (b) pressurized propellant gas contained in said plenum; and
   (c) thrust-producing means communicating with said gas plenum so as to contain said pressurized propellant gas in conjuction with said gas plenum and being operable to produce thrust upon command;
   (d) said thrust-producing means including means defining a thrust chamber communicating with said gas plenum such that said pressurized gas is contained concurrently by both of said thrust chamber and said gas plenum, a thrust-generating mechanism communicating with said thrust chamber and being actuatable between a closed condition in which no thrust is produced and an open condition producing thrust, and means for selectively actuating said thrust-generating mechanism;

(e) said actuating means of said thrust-producing means including an actuator disposed in said thrust chamber for movement between retracted and extended positions for correspondingly actuating said thrust-generating mechanism between its closed and open conditions, resilient means and pressure forces biasing said actuator to its retracted position and thereby said thrust-generating mechanism to its closed condition, and means for selectively communicating said pressurized propellant gas to said actuator independent of said thrust chamber for forcing said actuator against said biasing of said resilient means to its extended position and thereby said thrust-generating mechanism to its open positon.

4. In a propulsion system, the combination comprising:

(a) enclosure means defining a gas plenum;

(b) pressurized propellant gas contained in said plenum; and (c) thrust-producing means communicating with said gas plenum so as to contain said pressurized propellant gas in conjuction with said gas plenum and being operable to produce thrust upon command;

(d) said thrust-producing means including means defining a thrust chamber communicating with said gas plenum such that said pressurized gas is contained concurrently by both of said thrust chamber and said gas plenum, a thrust-generating mechanism communicating with said thrust chamber and being actuatable between a closed condition in which no thrust is produced and an open condition producing thrust, and means for selectively actuating said thrust-generating mechanism;

(e) said thrust-generating mechanism being an integrated valve and nozzle, said nozzle having a throat region communicating with said thrust chamber and said valve being mounted for movement relative to said nozzle for respectively opening and closing said throat region thereof upon actuation of said mechanism between said open and closed conditions.

5. The propulsion system as recited in claim 2, wherein said actuating means includes:

an actuator movably disposed in said thrust chamber and interconnected to said valve of said thrust-generating mechanism such that movement of said actuator between its retracted and extended positions correspondingly moves said valve to close and open of said nozzle throat region;

resilient means biasing said actuator to its retracted position the thereby said valve to close said nozzle throat region; and means for selectively communicating said pressurized propellant gas to said actuator independent of said thrust cavity for forcing said actuator against said biasing of said resilient means to its extended position and thereby said valve to open said nozzle throat region.

6. The propulsion system as recited in claim 5, wherein said means for selectively communicating said pressurized propellant gas to said actuator independent of said thrust cavity includes:

a pressure-releasing vent;

a passageway interconnective said actuator in flow communication with said gas plenum and said vent; and a switch member disposed in said passageway and being movable between an actuating position, wherein flow communication is blocked between said vent and said actuator and permitted between said plenum and said actuator such that said actuator is forced to its extended position, and a venting position, wherein flow communication is blocked between said plenum and said actuator and permitted between said vent and said actuator such that said actuator is returned to its retracted position by said pressure forces and resilient means.

7. The propulsion system as recited in claim 4, wherein said actuating means includes;

an actuator movably disposed in said thrust chamber and interconnected to said valve of said thrust-generating mechanism such that movement of said actuator between its retracted and extended positions correspondingly moves said valve to close and open said nozzle throat region;

resilient means and pressure forces biasing said actuator to its retracted position and thereby said valve to close said nozzle throat region; and means for selectively communicating said pressurized propellant gas to said actuator independent of said thrust chamber for forcing said actuator against said biasing of said resilient means to its extended position and thereby said valve to open said nozzle throat region.

8. The propulsion system as recited in claim 7, wherein said means for selectively communicating said pressurized propellant gas to said actuator independent of said thrust cavity includes:

a pressure-releasing vent;

a passageway interconnecting said actuator in flow communication with said gas plenum and said vent; and a switch member disposed in said passageway and being movable between an actuating position, wherein flow communication is blocked between said vent and said actuator and permitted between said plenum and said actuator such that said actuator is forced to its extended position, and a venting position, wherein flow communication is blocked between said plenum and said actuator and permitted between said vent and said actuator such that said actuator is returned to its retracted position by said resilient means and pressure forces.

9. The propulsion system of claim 5 wherein the actuator is repetively movable between open and closed positions, whereby to allow repeated use of the system.

10. The propulsion system of claim 6 wherein the actuator is repetively movable betwwen open and closed positions, whereby to allow repeated use of the system.

11. The propulsion system of claim 7 wherein the actuator is repetively movable between open and closed positions, whereby to allow repeated use of the system.

12. The propulsion system of claim 8 wherein the actuator is repetively movable between open and closed positions, whereby to allow repeated use of the system.

13. The propulsion system of claim 1 wherein the actuator is repetively movable between open and closed positions, whereby to allow repeated use of the system.

14. The propulsion of claim 2 wherein the actuator is repetively movable between open and closed positions, whereby to allow repeated use of the system.

15. The propulsion system of claim 3 wherein the actuator is repetively movable between open and closed positions, whereby to allow repeated use of the system.

16. The propulsion system of claim 4 wherein the actuator is repetively movable between open and closed positions, whereby to allow repeated use of the system.

* * * * *

UNITED STATES PATENT AND TRADEMARK OFFICE
CERTIFICATE OF CORRECTION

PATENT NO. : 4,805,399
DATED : February 21, 1989
INVENTOR(S) : Frank X. McKevitt It is certified that error appears in the above-identified patent and that said Letters Patent is hereby corrected as shown below:

IN THE SPECIFICATION:

In column 2, line 46, delete "nozle" and insert -- nozzle --.
In column 2, line 60, delete "interconnecation" and insert -- interconnecting --.
In column 4, line 31, delete "10" and insert -- 20 --.
In column 4, line 33, following "thereof," insert -- a gas plenum 24 in the tank 12 adjacent to the opposite end 18 thereof, --.

IN THE CLAIMS:

In claim 2, column 8, line 28, replace "siad" with -- said --.
In claim 10, column 10, line 60, replace "betwwen" with -- between --.

Signed and Sealed this

Seventeenth Day of April, 1990

Attest:

HARRY F. MANBECK, JR.

Attesting Officer

Commissioner of Patents and Trademarks